United States Patent
Bauerle et al.

(10) Patent No.: US 6,856,867 B2
(45) Date of Patent: Feb. 15, 2005

(54) AUTOMATIC REACTIVATION OF PASSENGER-ACTIVATED FUNCTIONS FOR SHORT ENGINE RUN CYCLE TIMES

(75) Inventors: Paul A. Bauerle, Fenton, MI (US); Thomas W. Odell, Whitby (CA)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/463,139

(22) Filed: Jun. 17, 2003

(65) Prior Publication Data

US 2004/0260437 A1 Dec. 23, 2004

(51) Int. Cl.[7] .................................................. G06F 7/00
(52) U.S. Cl. .......................... 701/36; 701/49; 307/10.1; 307/116; 340/428; 340/459; 340/527
(58) Field of Search ................................ 701/48, 36, 49; 340/426.11, 425.12, 438–439, 457, 457.1, 459–462, 517, 521, 527, 540, 428, 426.13, 426.36, 426.24; 307/9.1, 10.1, 10.3, 10.6, 10.7, 10.8, 116, 117

(56) References Cited

U.S. PATENT DOCUMENTS 5,666,028 A * 9/1997 Bechtel et al. ................. 315/82
6,052,998 A * 4/2000 Dage et al. ..................... 62/89
6,163,690 A * 12/2000 Lilja ........................... 455/574
6,626,001 B2 * 9/2003 Hamachi et al. ........... 62/228.1

FOREIGN PATENT DOCUMENTS

EP          635408 A1 * 1/1995 ........... B60R/25/10

* cited by examiner

Primary Examiner—Jacques H. Louis-Jacques
(74) Attorney, Agent, or Firm—Christopher DeVries

(57) ABSTRACT

Methods and apparatus are provided for automatically reactivating passenger-activated functions in an automobile, upon restart of the automobile engine, following an engine shutdown. The functional status of each passenger-activated function that is activated when the engine is shut off is stored. An activation time of each passenger-activated function, which corresponds to the time that the passenger-activated function was activated prior to the engine being shut off, is also stored. Upon engine restart, each passenger-activated function that was previously activated is reactivated to its stored functional status, if its stored activation time is less than a predetermined calibration time.

18 Claims, 2 Drawing Sheets

AUTOMATIC REACTIVATION OF PASSENGER-ACTIVATED FUNCTIONS FOR SHORT ENGINE RUN CYCLE TIMES

FIELD OF THE INVENTION

The present invention generally relates to the automatic reactivation of passenger-activated functions and, more particularly, to the automatic reactivation of passenger-activated functions in automobiles, upon re-starting of the automobile engine, following an engine shutdown.

BACKGROUND OF THE INVENTION

Many automobiles include various functional amenities such as, for example, heated seats, heated mirrors, window defoggers, and fog lights. Many of these functions may be classified as so-called passenger-activated functions. This means that the functions are activated by a passenger. Such activation may occur by a passenger pressing or turning an activation knob or button. In addition to activation, these functions may also be operated in a plurality of operational conditions. For example, a passenger may activate a seat heating function, and then control the seat heater to a desired level of warmth using, for example, a rotating or sliding knob or lever. If one or more of these functions is activated and the automobile engine is subsequently turned off, many of these passenger-activated functions are deactivated and remain deactivated when the engine is once again started. Thus, if the function is still desired, a passenger needs to reactivate the function upon engine restart.

Although the above-described operational configuration for various passenger-activated functions is generally satisfactorily, it does suffer certain drawbacks. For example, on a cold morning a driver may enter their vehicle and activate one or more passenger-activated functions. After driving a short time period, and before the activated function has had time to operate effectively, the driver may drive into an interim destination, such as a gas station, and shut the vehicle engine off for a relatively short time period. As was noted above, when the vehicle engine is shut off, each of the previously activated passenger-activated functions is deactivated.

Once the driver is ready to leave the interim destination, they may then start the engine back up and recommence driving to another destination. After driving a short time period, the driver may realize that the previously activated functions are no longer activated. Thus, the driver may attempt to reactivate one or more of these previously activated functions while driving, and could become distracted from their primary focus. Such distractions can potentially result in driver infractions or accidents.

One solution to the above-described scenario is to include a simple on/off switch that is hardwired to each passenger-activated function so that it reactivates upon engine start-up if it were activated at engine shutdown. However, this can result in a passenger-activated function being activated indefinitely if it is activated inadvertently, or if the driver simply forgot it was previously activated, and the driver does not notice the function is activated. This can lead to unnecessary fuel consumption, and can potentially shorten the life of various components used to implement the function, which can increase maintenance costs.

Accordingly, it is desirable to provide a system and method for reactivating a passenger-activated function that was previously activated that does not result in potential driver distraction. In addition, it is desirable to provide a system and method for reactivating a passenger-activated function that was previously activated that alleviates the potential for unneeded fuel consumption, does not shorten component lifetime, or increase maintenance costs.

BRIEF SUMMARY OF THE INVENTION

The present invention provides a system and method for reactivating, upon engine restart, a passenger-activated function that was previously activated.

In one exemplary embodiment, in an automobile having an engine and one or more passenger-activated functions each having a functional status, a method of reactivating a passenger-activated function that was previously activated by an automobile passenger includes storing the functional status of each passenger-activated function that is activated when the engine is shut off. An activation time of each passenger-activated function is stored. The activation time corresponds to a time that the passenger-activated function was activated prior to the engine being shut off. Upon restart of the engine, each passenger-activated function that was previously activated is reactivated to its stored functional status, if its stored activation time is less than a predetermined calibration time.

In another exemplary embodiment, in an automobile having an engine, a system for reactivating previously activated functions includes a controller, a timer circuit, and memory. The controller is operable to at least monitor one or more passenger-activated functions, each of which has a functional status. The timer circuit is in operable communication with the controller and is operable to determine an activation time of each passenger-activated function. The activation time corresponds to a time that the passenger activated function was activated prior to the engine being shut off. The memory coupled to receive and store, upon engine shut-off, both the functional status and the activation time of each passenger-activated function that is activated when the engine is shut off. The controller is further operable, upon engine restart, to reactivate, to its stored functional status, each passenger-activated function that was activated when the engine was shut off, if its stored activation time is less than a predetermined calibration time.

In yet another exemplary embodiment, an automobile includes an engine, a controller, timer circuit, and a memory. The controller is operable to monitor and control one or more passenger-activated functions, each of which has a functional status. The timer circuit is in operable communication with the controller and is operable to determine an activation time of each passenger-activated function. The activation time corresponds to a time that the passenger activated function was activated prior to the engine being shut off. The memory is coupled to the controller and the timer and is operable, upon engine shut-off, to store both the functional status and the activation time of each passenger-activated function that is activated when the engine is shut off. The controller is further operable, upon engine restart, to reactivate, to its stored functional status, each passenger-activated function that was activated when the engine was shut off, if its stored activation time is less than a predetermined calibration time.

Other independent features and advantages of the preferred embodiment will become apparent from the following detailed description, taken in conjunction with the accompanying drawings which illustrate, by way of example, the principles of the invention

DETAILED DESCRIPTION OF A PREFERRED EMBODIMENT

The following detailed description is merely exemplary in nature and is not intended to limit the invention or the application and uses of the invention. Furthermore, there is no intention to be bound by any theory presented in the preceding background of the invention or the following detailed description.

Figure 1:
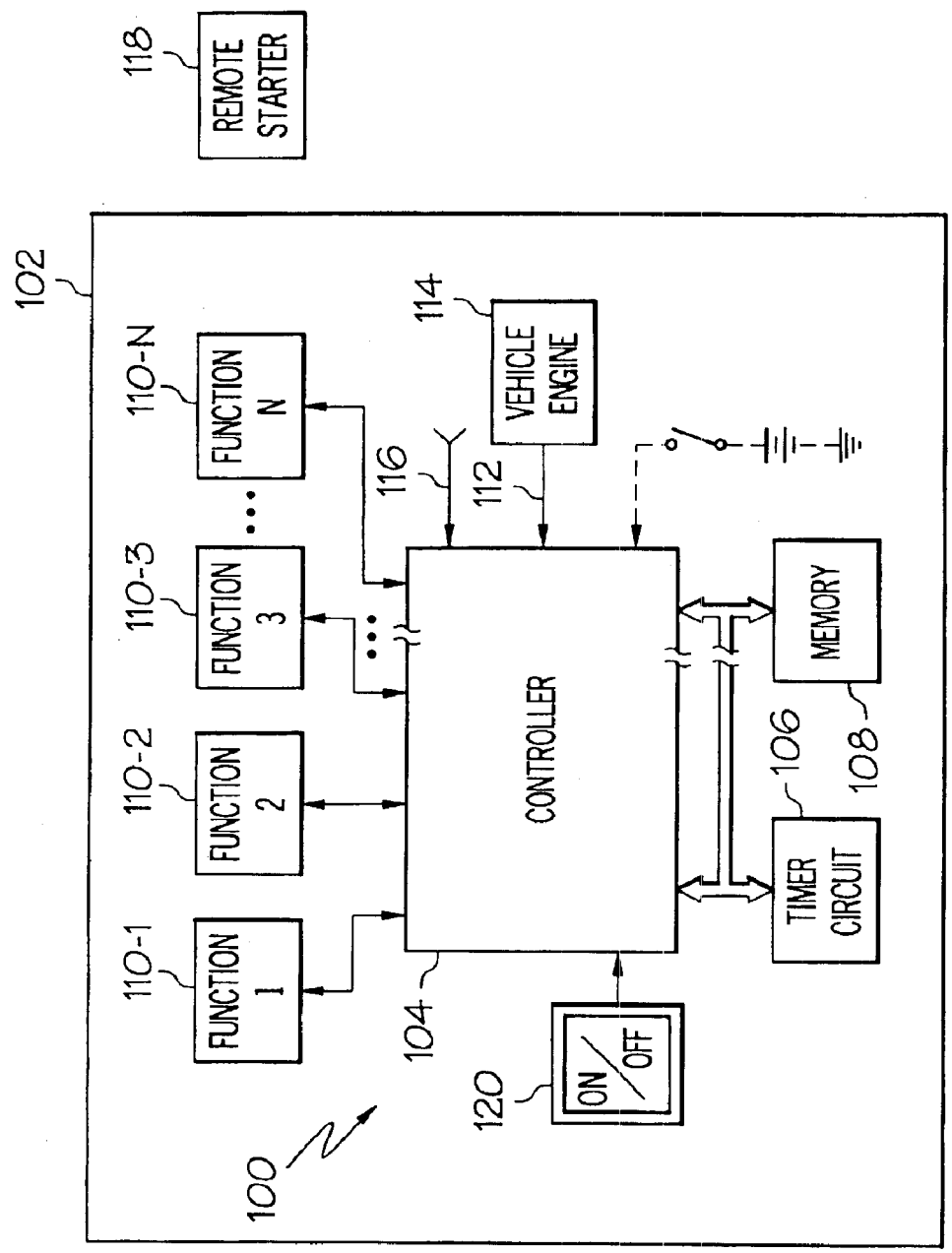
FIG. 1 is a functional block diagram of a system for reactivating previously activated functions in an automobile according to an embodiment of the present invention.

An embodiment of a system for reactivating previously activated functions in an automobile is depicted, in functional block diagram form, in FIG. 1. The system 100 is preferably installed in an automobile 102 and includes a controller 104, a timer circuit 106, and a memory 108. The controller 104 is coupled to one or more passenger-activated functions 110-1, 110-2, 110-3, . . . 110-N. It will be appreciated that the passenger-activated functions 110-1, 110-2, 110-3, . . . 110-N may be any one of numerous functions that a passenger may selectively activate and de-activate by, for example, pressing a button or turning a knob. Non-limiting examples of passenger-activated functions 110-1, 110-2, 110-3, . . . 110-N include a seat heater, mirror heaters and/or defoggers, window defoggers, and fog lamps.

The controller 104 monitors the functional status of each of the passenger-activated functions 110-1, 110-2, 110-3, . . . 110-N and, under certain circumstances, automatically activates one or more of the functions 110-1, 110-2, 110-3, . . . 110-N. The circumstances under which the controller 104 automatically activates each function 110-1, 110-2, 110-3, . . . 110-N will be described in more detail further below. It will the appreciated that the controller 104 may be configured to not only monitor each passenger-activated function 110-1, 110-2, 110-3 . . . 110-N, but to additionally control one or more of the functions 110-1, 110-2, 110-3, . . . 110-N. The controller 104 also receives an engine status signal 112, which is representative of the operational status of the vehicle engine 114. The engine status signal 112 may come directly from a sensor or other signal source coupled to the vehicle engine 114, or from the vehicle ignition switch (shown in phantom in FIG. 1). When the vehicle engine is turned off, as indicated by the engine status signal 112, the controller 104 stores the functional status (e.g., whether it is activated or deactivated and, if activated, the function setting) of each passenger-activated function 110-1, 110-2, 110-3, . . . 110-N in memory 108. Although a single controller 104 is shown in communication with each passenger-activated function 110-1, 110-2, 110-3, . . . 110-N, it will be appreciated that N-number of controllers 104 (e.g., one per function) could also be used.

The timer circuit 106 is coupled to, or is integrally formed as part of, the controller 104, and measures the activation time of each of the passenger-activated functions 110-1, 110-2, 110-3, . . . 110-N. The activation time, as used herein, is the amount of time each passenger-activated function 110-1, 110-2, 110-3, . . . 110-N is activated prior to being deactivated when the vehicle engine 114 is shutdown. It will be appreciated that the timer circuit 106 may include N-number of clock sources, one for each passenger-activated function 110-1, 110-2, 110-3, . . . 110-N, or N-number of separate timer circuits 106 may be coupled to the controller 104. In either case, the timer circuit 106 commences measuring the activation time of each passenger-activated function 110-1, 110-2, 110-3, . . . 110-N upon the function's activation, and ceases its measurement when the passenger-activated function 110-1, 110-2, 110-3, . . . 110-N is deactivated. If the passenger-activated function 110-1, 110-2, 110-3, . . . 110-N is deactivated because the vehicle engine 114 is turned off, the activation time for the passenger-activated function 110-1, 110-2, 110-3, . . . 110-N is stored in memory 108. The timer circuit 106 also measures an engine shut-off time, which is the amount of time that the vehicle engine 114 is shut down. Thus, when the vehicle engine 114 is turned off, the timer circuit 106 commences measuring the shut-off time, and ceases its measurement when the vehicle engine 114 is subsequently re-started, or after a predetermined amount of shut-off time has elapsed, whichever occurs first. Although a single timer circuit 106 is depicted and described herein, it will be appreciated that N-number of individual timer circuits 106 could also be used.

The memory 108 is in operable communication with both the controller 104 and the timer circuit 106 and, as was described above, receives and stores various data associated at least with each of the passenger-activated functions 110-1, 110-2, 110-3, . . . 110-N. In addition, the memory 108 may store the software that implements the functionality of the system 100. It will be appreciated, however, that the controller functionality could be implemented in firmware, as well.

As was noted above, the controller 104 also, under certain circumstances, automatically activates one or more of the passenger-activated functions 110-1, 110-2, 110-3, . . . 110-N. In particular, if a passenger-activated function 110-1, 110-2, 110-3, . . . 110-N is active when the vehicle engine 114 is shutdown, and its activation time was less than a predetermined calibration time, then, upon restart of the vehicle engine 114, the controller 104 will automatically activate the previously active function 110-1, 110-2, 110-3, . . . 110-N to its functional status prior to the vehicle engine 114 being shutdown, if the engine shut-off time is also less than a predetermined soak time. It should be appreciated that the predetermined calibration time may vary from function to function. For example, the calibration time associated with a seat heater function may be different than the calibration time associated with a mirror heater, and so on.

Alternatively, or in addition to the above, the system 100 may be implemented such that each previously activated function 110-1, 110-2, 110-3, . . . 110-N is reactivated upon engine restart, if the function's activation time was less than its predetermined calibration time and the vehicle engine 114 was started remotely. With this implementation, a passenger may activate selected ones of the functions 110-1, 110-2, 110-3, . . . 110-N prior to turning off the vehicle engine 114. Then, when the vehicle is started remotely, the passenger would come to the vehicle at a slightly later time, after the previously selected functions 110-1, 110-2, 110-3, . . . 110-N have been activated for a period of time. As FIG. 1 further illustrates, for this particular implementation, the controller 104 would receive a signal 116 indicating that the vehicle engine 114 was started remotely. This signal 116 could come from the vehicle engine 114 or a remote engine start-up device 118.

The controller 104 may also include one or more switches, buttons, or knobs 120 that may be used to activate or inactivate the automatic reactivation function for each of the passenger-activated functions 110-1, 110-2, 110-3, . . . 110-N. It will be appreciated that a single switch 120 may be used for all of the passenger-activated functions 110-1, 110-2, 110-3, . . . 110-N, or a separate switch 120 may be provided for each passenger-activated function 110-1, 110-2, 110-3, . . . 110-N.

Figure 2:
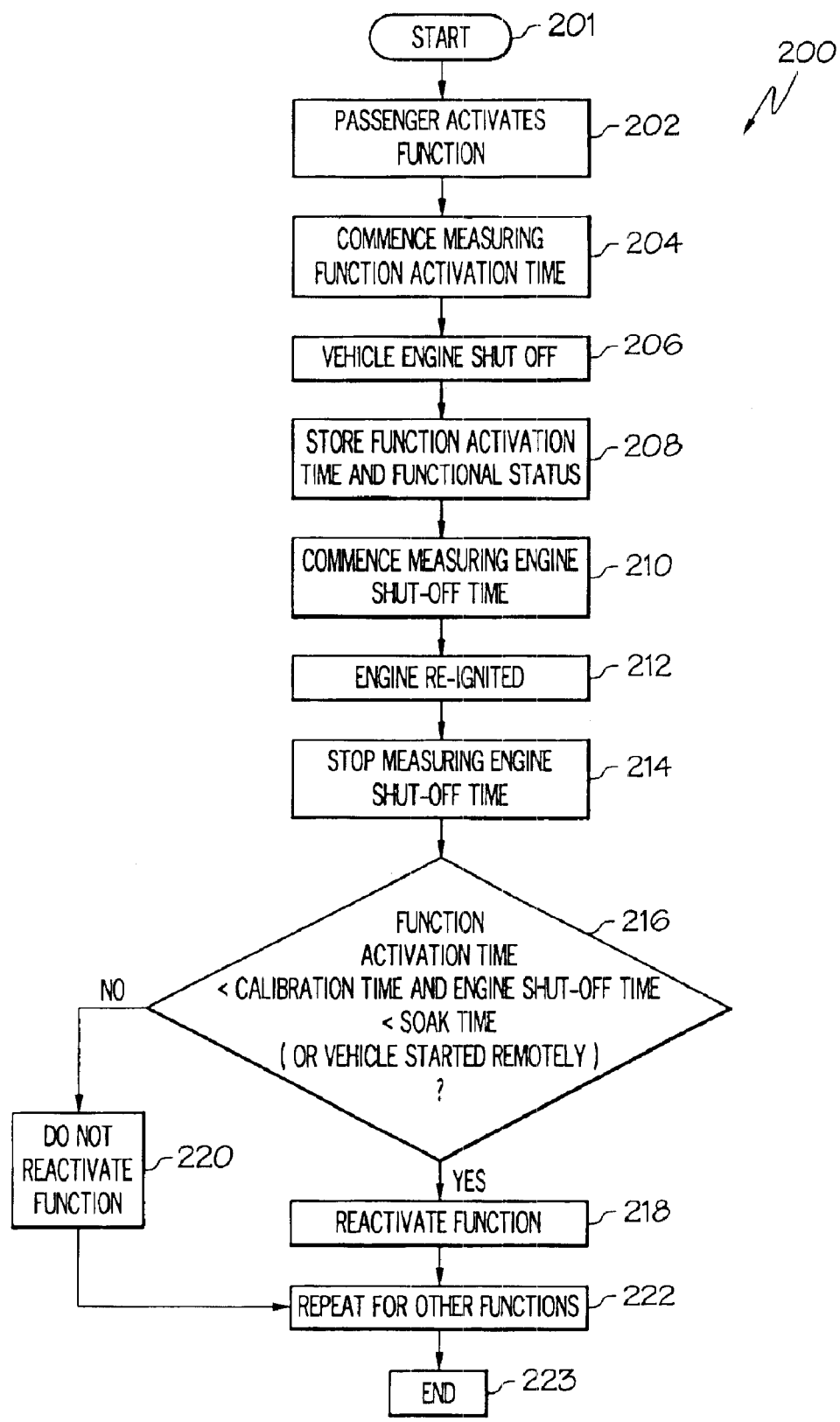
FIG. 2 is a flowchart depicting a method for reactivating previously activated functions in an automobile that may be implemented by the system depicted in FIG. 2.

Having described the system 100 specifically from a structural standpoint, and generally from a functional standpoint, a specific description of a preferred embodiment of a method of implementing the described functionality will now be provided. In doing so, reference should be made to FIG. 2, in combination with FIG. 1. The parenthetical references in FIG. 2 correspond to the particular reference numerals of the methodological flow illustrated therein.

The overall process 200 begins when a vehicle passenger, be it the vehicle driver or other passenger, starts the vehicle engine 114 and activates one or more of the passenger-activated functions 110-1, 110-2, 110-3, . . . 110-N (202). In addition to activating the function 110-1, 110-2, 110-3, . . . 110-N, the passenger may also, as was described above, control the activated functions 110-1, 110-2, 110-3, . . . 110-N to a desired level. As was noted above, upon activation of each function 110-1, 110-2, 110-3, . . . 110-N, the timer circuit 106 commences measuring the activation time of the activated function 110-1, 110-2, 110-3, . . . 110-N (204). When the vehicle engine 114 is turned off (206), the functional status of each function 110-1, 110-2, 110-3, . . . 110-N that was activated when the engine 114 was turned off, and each of these functions' activation times, are both stored in memory 106 (208). The timer circuit 106 then commences measuring the shut-off time of the vehicle engine 114 (210).

Thereafter, when the vehicle engine 114 is once again re-started (212), the timer circuit 106 ceases measuring the engine shut-off time (214). The activation time of a previously activated function 110-1, 110-2, 110-3, . . . 110-N is then compared to a predetermined calibration time, and the engine shut-off time is compared to a predetermined soak time (216). If the activation time of the function 110-1, 110-2, 110-3, . . . 110-N is less than the predetermined calibration time associated with that function, and the engine shut-off time is less than the predetermined soak time (or the vehicle engine 114 is started remotely), then the function 110-1, 110-2, 110-3, . . . 110-N is reactivated to its functional status prior to engine shut-off (218). If either, or both, the activation time and the engine shut-off time are not less than the predetermined calibration time and the predetermined engine soak time, respectively, then the previously activated function 110-1, 110-2, 110-3, . . . 110-N is not reactivated (220). In this latter instance, a passenger will need to active the function 110-1, 110-2, 110-3, . . . 110-N manually. The previous portions of the process 200 (e.g., 214–218) are then repeated for each the previously activated functions 110-1, 110-2, 110-3, . . . 110-N (222).

The system and method described herein automatically reactivates, upon restart of the engine, a passenger-activated function that was previously activated, which can alleviate potential driver distractions, alleviates the potential for unneeded fuel consumption, can potentially increase component lifetime, and potentially reduce maintenance costs.

While an exemplary embodiment(s) has been presented in the foregoing detailed description of the invention, it should be appreciated that a vast number of variations exist. It should also be appreciated that these exemplary embodiments are only examples, and are not intended to limit the scope, applicability, or configuration of the invention in any way. Rather, the foregoing detailed description will provide those skilled in the art with a convenient road map for implementing a preferred embodiment of the invention. It being understood that various changes may be made in the function and arrangement of elements described in an exemplary preferred embodiment without departing from the spirit and scope of the invention as set forth in the appended claims.

What is claimed is:

1. In an automobile having an engine and one or more passenger-activated functions each having a functional status, a method of reactivating a passenger-activated function that was previously activated by an automobile passenger, the method comprising:

storing the functional status of each passenger-activated function that is activated when the engine is shut off;

storing an activation time of each passenger-activated function, the activation time corresponding to a time that the passenger-activated function was activated prior to the engine being shut off;

reactivating upon engine restart, each passenger-activated function that was previously activated to its stored functional status, if its stored activation time is less than a predetermined calibration time;

determining an engine shut-off time, which corresponds to a time that the engine has been shut-off; and wherein each passenger-activated function is reactivated to its stored functional status if (i) its stored activation time is less than a predetermined calibration time and (ii) the engine shut-off time is less than a predetermined soak time.

2. The method of claim 1, wherein the passenger-activated function is reactivated to its stored functional status if (i) its stored activation time is less than a predetermined calibration time and (ii) the engine is re-stated remotely.

3. The method of claim 1, further comprising:

initiating a driver notification upon the reactivation of each passenger-activated function.

4. The method of claim 1, further comprising:

determining if a capability to reactivate a passenger-activated function upon engine restart has been activated by the automobile passenger.

5. The method of claim 1, wherein the passenger-activated function is a seat healer.

6. The method of claim 1, wherein the passenger-activated function is a mirror heater.

7. The method of claim 1, wherein the passenger-activated function is a window defogger.

8. The method of claim 1, wherein the passenger-activated function includes one or more lights.

9. In an automobile having an engine, a system for reactivating previously activated functions, comprising:

a controller operable to at least monitor one or more passenger-activated functions, each passenger-activated function having a functional status;

a timer circuit in operable communication with the controller and operable to determine an activation time of each passenger-activated function, the activation time corresponding to a time that the passenger activated function was activated prior to the engine being shut off; and a memory coupled to receive and store, upon engine shut-off, both the functional status and the activation time of each passenger-activated function that is activated when the engine is shut off;

wherein the controller is further operable, upon engine restart, to reactivate, to its stored functional status, each passenger-activated function that was activated when the engine was shut off, if its stored activation time is less than a predetermined calibration time;

wherein the timer circuit is further operable to determine an engine shut-off time, which corresponds to a time that the engine has been shut; and wherein the controller is operable, upon engine restart, to reactivate each passenger-activated function to its stored functional status if (i) its stored activation time is less than a predetermined calibration time and (ii) the engine shut-off time is less than a predetermined soak time.

10. The system of claim 9, wherein the controller is operable, upon engine restart, to reactivate each passenger-activated function to its stored functional status if (i) its stored activation time is less than a predetermined calibration time and (ii) the engine is re-started remotely.

11. The system of claim 9, wherein the controller is further operable to generate one or move driver notification signals, each signal be generated upon the reactivation of each passenger-activated function.

12. The system of claim 9, further comprising:

a reactivation functional selector coupled to the contoller, the reactivation function selector having at least an on position and an off position, wherein the controller is operable to reactivate a passenger-activated function upon engine restart, if the reactivation function selector is in the on position.

13. The system of claim 9, wherein the passenger-activated function is a seat heater.

14. The system of claim 9, wherein the passenger-activated function is a mirror heater.

15. The system of claim 9, wherein the passenger-activated function is a window defogger.

16. The system of claim 9, wherein the passenger-activated function includes one or more lights.

17. An automobile comprising:

an engine;

a controller operable to at least monitor one or more passenger-activated functions, each passenger-activated function having a functional status;

a timer circuit in operable communication with the contoller and operable to determine an activation time of each passenger-activated function, the activation time corresponding to a time that the passenger activated function was activated prior to the engine being shut off; and a memory coupled to receive and store, upon engine shut-off, both the functional status and the activation time of each passenger-activated function that is activated when the engine is shut off;

wherein the controller is further operable, upon engine restart, to reactivate, to its stored functional status each passenger-activated function that was activated when the engine was shut off, if its stored activation time is less than a predetermined calibration time;

wherein the timer circuit is further operable to determine an engine shut-off time, which corresponds to a time that the engine has been shutoff; and wherein the controller is operable, upon engine restart, upon to reactivate each passenger-activated function to its stored functional status if (i) its stored activation time is less than a predetermined calibration time and (ii) the engine shut-off time is less than a predetermined soak time.

18. The automobile of claim 17 wherein the controller is operable, upon engine restart, to reactivate each passenger-activated function to its stored functional status if (i) its stored activation time is less than a predetermined calibration time and (ii) the engine is re-started remotely.

* * * * *